United States Patent [19]
Smith, Jr. et al.

[11] Patent Number: 4,612,470
[45] Date of Patent: Sep. 16, 1986

[54] ELECTRIC GENERATOR WITH TWO ROTORS

[76] Inventors: Berry E. Smith, Jr., Star Rte. 1, Box 392; Nathan N. Sharron, Star Rte. 1, Box 5220, both of Tallahassee, Fla. 32304

[21] Appl. No.: 731,476
[22] Filed: May 7, 1985
[51] Int. Cl.⁴ .......................................... H02K 57/00
[52] U.S. Cl. .................................................. 310/273
[58] Field of Search ................. 310/86, 104, 114, 126, 310/156, 266, 168, 198, 203, 206, 208, 273, 180, 182, 184, 254; 322/90

[56] References Cited
U.S. PATENT DOCUMENTS

| 3,484,635 | 12/1969 | MacKallor, Jr. | 310/156 |
| 3,508,138 | 4/1970 | Schatz | 322/90 |
| 3,515,918 | 6/1970 | Otto | 310/126 |
| 3,898,490 | 8/1975 | Wedman | 310/114 |
| 3,973,137 | 8/1976 | Drobina | 310/114 |
| 4,331,896 | 5/1982 | Sedgewick | 310/207 |

FOREIGN PATENT DOCUMENTS
1039004 8/1983 U.S.S.R. ............................. 310/114

Primary Examiner—Patrick R. Salce
Assistant Examiner—D. L. Rebsch
Attorney, Agent, or Firm—Earl L. Tyner

[57] ABSTRACT

An apparatus including a stationary field coil wound with alternating insulated copper wire and insulated steel wire; a rotatable armature comprising a plurality of lengthwise rows of magnets, each row being of a single polarity which is opposite from the polarity of the next adjacent rows; a rotatable sleeve positioned between the field coil and the armature and spaced apart from each, the sleeve comprising a plurality of lengthwise strips of material that attract magnetic flux, spaced apart from each other by a strip of magnetic material that is transparent to magnetic flux, and means to rotate the armature or the sleeve while the other remains stationary.

21 Claims, 10 Drawing Figures

ELECTRIC GENERATOR WITH TWO ROTORS

BACKGROUND OF THE INVENTION

Electric generators are well known types of equipment which produce electricity by causing an electric conductor to pass through lines of magnetic force (flux). The large stationary field coil contains large iron masses with coils of electrically conductive wire, e.g., copper, wound around the iron core. When electricity is passed through the coil the iron core becomes magnetic and the magnetic flux extends outward from the north pole of the magnet and circles around to return to the magnet at the opposite end, the south pole of the magnet. The armature is a plurality of spaced electrical conductors on the surface of a cylinder which rotates inside the coil and in a close spaced relationship with the coil. As the armature rotates, its electrical conductors cut through the magnetic flux from the field coil which induces electricity to flow in the conductors of the armature. By means of brushes or slip rings contacting the armature as it rotates, the induced electricity can be withdrawn for use in any desired manner. Such prior art generators are heavy and produce large amounts of heat in addition to requiring frequent maintenance and replacement of brushes and slip rings.

It is an object of the present invention to provide an improved electric generator. It is another object to provide a generator wherein the use of brushes or slip rings is omitted. Still other objects will become apparent from the more detailed portion of the description which follows.

BRIEF DESCRIPTION OF THE INVENTION

This invention relates to an electric generator including a stationary field coil, an armature rotatable within the field coil, and a warp sleeve rotatable between said coil and said armature; said coil comprising side-by-side alternating insulated strands of twisted wire, one insulated strand consisting of twisted copper wire and the other insulated strand consisting of twisted steel wire; said armature comprising a cylindrical core structure containing on its outside surface a plurality of at least six alternating strips of magnetic material, adjacent strips being of opposite polarity; said warp sleeve comprising a hollow cylinder positioned in close proximity to and spaced apart from the inner surface of said coil and the outer surface of said armature, said sleeve having over its entire length alternate lengthwise strips of material transparent to magnetic flux and material attractive to magnetic flux.

In preferred embodiments of this invention the armature is a rotatable tube covered with lengthwise strips of permanent magnets each strip being of a single polarity and being adjacent to substantially equal strips of the opposite polarity; and the warp sleeve is a rotatable tube of a plurality of lengthwise strips of aluminum spaced apart from each other by equal size strips of steel.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
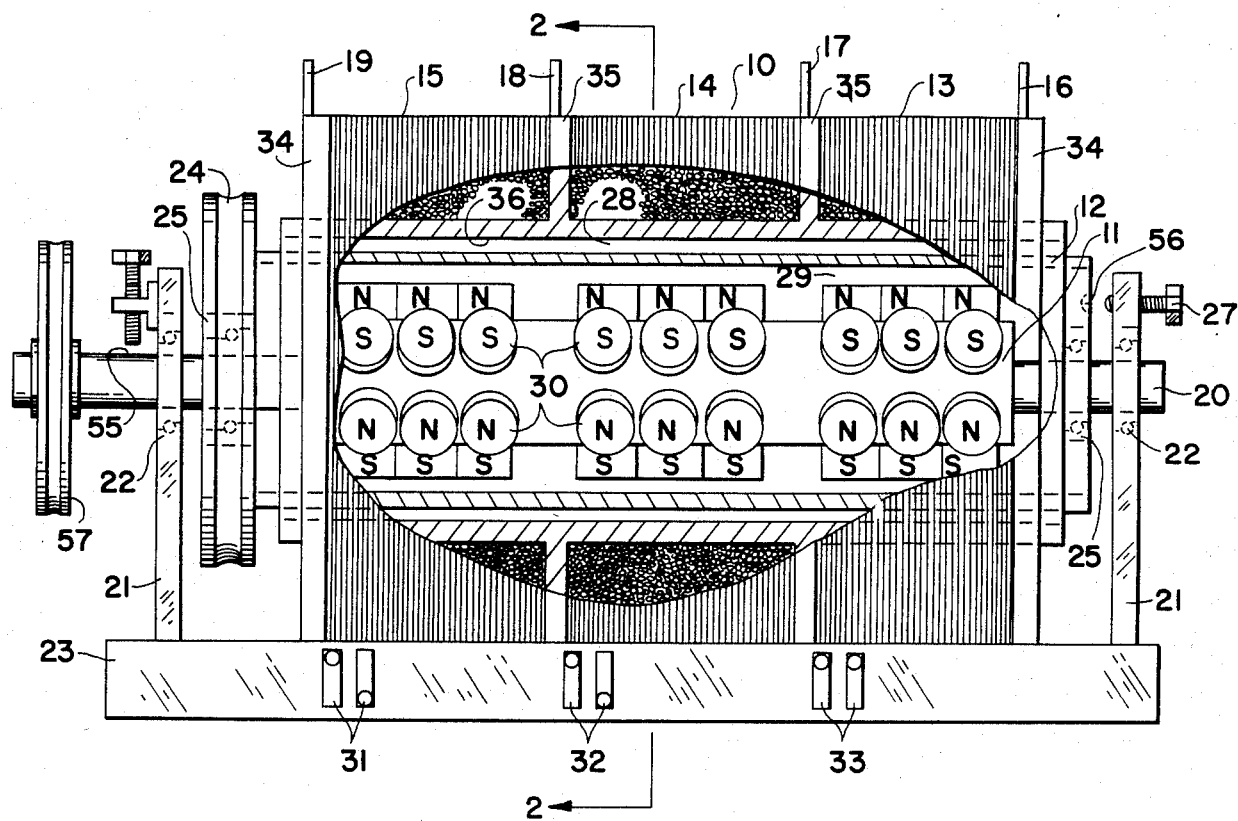
FIG. 1 is a front elevational view of the generator of this invention.
Figure 2:
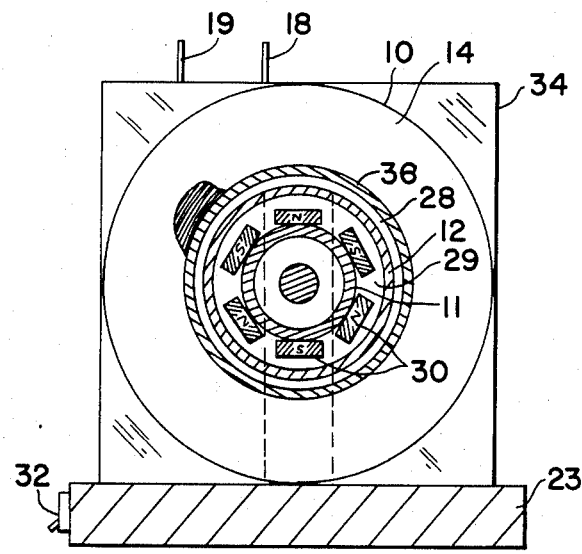
FIG. 2 is a cross sectional view of the generator of FIG. 1 taken at 2—2.
Figure 3:
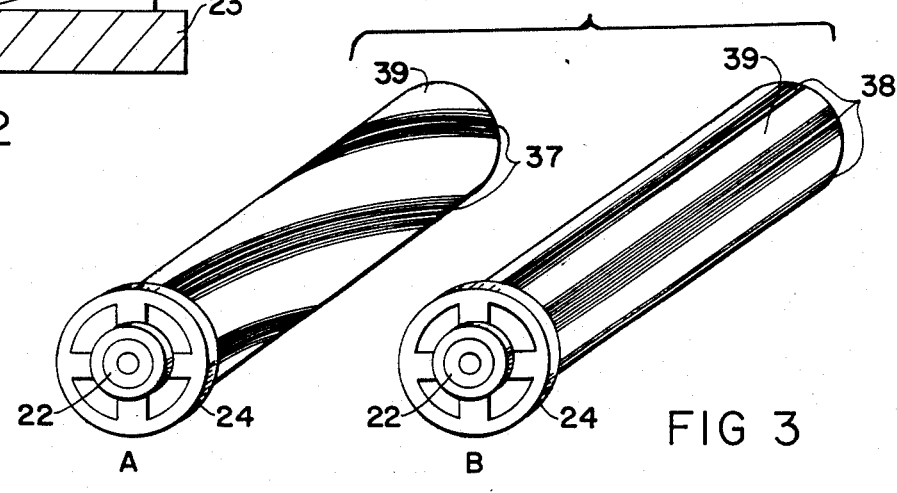
FIG. 3 is a perspective view of two types of warp sleeves employed in this invention.

The components of the generator of this invention are best seen in FIGS. 1, 2, and 3. The generator comprises a stationary field coil 10, a rotatable armature 11, and a rotatable warp sleeve 12 assembled concentrically. Armature 11 is the innermost component in the form of a cylindrical tube. Field coil 10 is the outermost component having a central cylindrical passageway formed by bottom wall 36. The central component is warp sleeve 12 which is a cylindrical tube. Each of these three components is spaced apart from the adjacent components so that none touches any other component. Space 28 separates coil 10 bottom wall 36 from the outer surface of warp sleeve 12. Space 29 separates the inner surface of warp sleeve 12 from the outer surface of armature 11.

Armature 11 is rotatable by reason of being mounted on shaft 20 which rotates in bearings mounted in shaft supports 21. Shaft supports 21 and coil 10 are both rigidly attached to base 23.

Warp sleeve is rotatable by reason of bearings 25 on shaft 20, with a spider structure at each end of sleeve 12 being affixed to bearings 25. Normally armature 11 is stationary when sleeve 12 is rotatable, and vice versa, armature 11 is rotatable when sleeve 12 is stationary. Any suitable means may be employed to make armature 11 or sleeve 12 stationary. In the preferred embodiment shaft 20 is machined to produce a flattened portion 55 which can then be selectively engaged by set screw means 26 to make shaft 20 and armature 11 stationary. Sleeve 12 is made stationary by the engagement of set screw means 27 in recess 56. Pulley 24 is affixed to sleeve 12 and may be connected to a belt and suitable motor (not shown) to rotate sleeve 12. Pulley 57 is affixed to shaft 20 and may be connected to a belt and suitable motor (not shown) to rotate armature 11.

Figure 6:
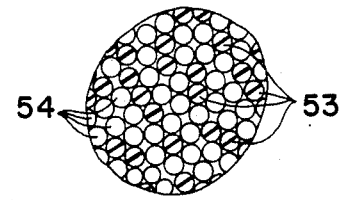
FIG. 6 is a cross sectional view of the field coil taken at 6—6 of FIG. 5.

Field coil 10 is preferably divided into a plurality of coils, the number shown here are three, 13, 14, and 15. Each coil is contained in a compartment formed by bottom wall 36 and two of side walls 34 and 35. Walls 34, 35 and 36 are preferably a rigid lightweight electric insulation material that is not magnetically attracted, e.g., reinforced plastic. This compartmentalization reduces the size of each coil and provides some flexibility in the means of operation. Each coil 13, 14, and 15 consists of separate lengths of two different types of insulated wire. One wire is copper or other electrically conductive material that is not capable of magnetic attraction. The other wire is steel or other material that is subject to magnetic attraction. Preferably the windings in each of coils 13, 14, and 15 are of alternate wires of each type as shown in FIG. 6 wherein steel wires 53 and copper wires 54 are in adjacent, side-by-side positions. It also is preferable for each wire 53 and 54 to consist of a plurality of twisted fine wires rather than a single large wire. The increased number of twisted strands provides better operational characteristics than a single wire of larger size.

Armature 11 has its outside surface covered with lengthwise strips of magnetic material, each strip being of one polarity (i.e., north or south) and the adjacent strips being of opposite polarity. In these drawings the strips of magnetic material are made up of several permanent magnets 30 (the ones shown are disc-shaped) placed in lengthwise parallel rows which may be straight and parallel to the axis of the armature or they may be spirally positioned similar to the strips on warp sleeve 12 as shown in FIGS. 3A and 3B. The letter "N" is intended to show that the north pole faces outwardly in one row and the letter "S" is intended to show that the south pole faces outwardly. In FIG. 2 it may be seen that armature 11 is covered with six equally spaced rows of magnets, every other row having the north pole facing outwardly, and the rows in between having the south pole facing outwardly.

Warp sleeve 12 is a hollow tube of material that is transparent to magnetic flux. Spaced around outside surface of sleeve 12 are a plurality of strips of material that is magnetically attracted, e.g., steel, iron, nickel, etc. In FIG. 3 there are shown two embodiments of such sleeves. In FIG. 3A strips 37 are positioned helically around tube 39. In FIG. 3B strips 38 are parallel to each other and to the axis of the tube 39. The best results are achieved if the sleeve of FIG. 3A is used with an armature 11 in which magnets 30 are positioned spirally; or if sleeve of FIG. 3B is used with an armature 11 in which magnets 30 are positioned in straight parallel rows. Tube 39 may be made of aluminum and strips 37 and 38 may be made of steel.

Figure 7B:
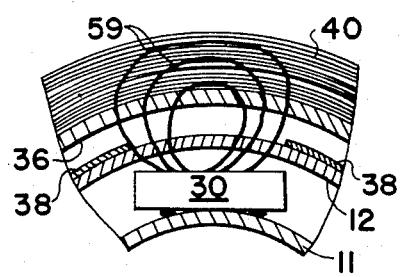
FIG. 7 is a schematic illustration of how the magnetic flux is distorted by the warp sleeve of this invention.
Figure 7A:
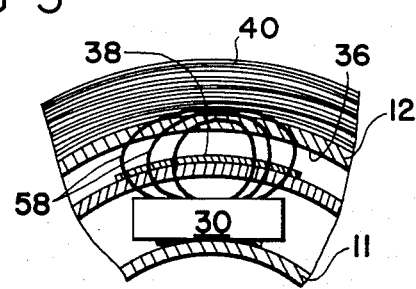

In the operation of the generator of this invention either armature 11 or warp sleeve 12 may be rotated while the other of the two is kept stationary. In both instances the apparatus generates electricity in the field coil 10 which may be tapped off for use elsewhere. Magnetic flux is projected outwardly from magnets 30 a distance sufficient to extend into coils 13, 14, and 15. In order to induce electric current to flow, the flux from magnets 30 must be cut by an electric conductor passing through the flux. In this instance, contrary to prior art procedures, the conductor is stationary and the magnetic flux passes by the conductor, e.g., by the rotation of shaft 20. Alternately the flux which passes a given conductor is moving in one direction (for a north pole passing by) and then in the opposite direction (for a south pole passing by). This produces alternating current (AC) flow in the windings of field coil 10. Warp sleeve 12 provides a remarkable improvement in the induction of electric current flow in field coil 10. When magnetically attractive strips (37 or 38 in FIG. 3) are between magnet 30 and field coil 10 the magnetic flux is distorted or warped from its natural flow outward of the surface of the magnet to a position close to the surface of strip 37 or 38. This may be best seen in FIG. 7 wherein the position of the magnetic flux is seen in two instances. In FIG. 7A magnetically attractive strip 38 on sleeve 12 is directly above magnet 30 and the flux 58 is distorted and kept very close to strip 38. In FIG. 7B magnet 30 is directly under the space between adjacent strips 38, and in this space only the non-magnetically attractive material, e.g., aluminum, of sleeve 12 separates magnet 30 from coil 10. In this instance flux 59 extends normally up into coil 10 and causes the induction electric current in coil 10. It may be appreciated, therefore, that as magnets pass under strips 38 and then under the space between strips in a continuing alternating manner current is induced in pulses, first one way and then the other way, as the north pole and then the south pole passes by.

The procedure is exactly the same if sleeve 12 is rotated and armature is made stationary. As sleeve 12 rotates, strips 37 or 38 alternately distort or warp the flux from magnets 30 causing the pulsing induction of alternating current in coil 10. The spiral strips 37 (FIG. 3A) and the linear strips 38 (FIG. 3B) are both operative, producing substantially the same induction of current. It appears, however, that when the spiral sleeve FIG. 3A is used with armature 11 having straight rows of magnets 30 the highest voltage is produced at a lower r.p.m. of the sleeve than when other combinations are used, e.g., sleeve of FIG. 3B with spiral rows of magnets 30 on armature 11.

Figure 4:
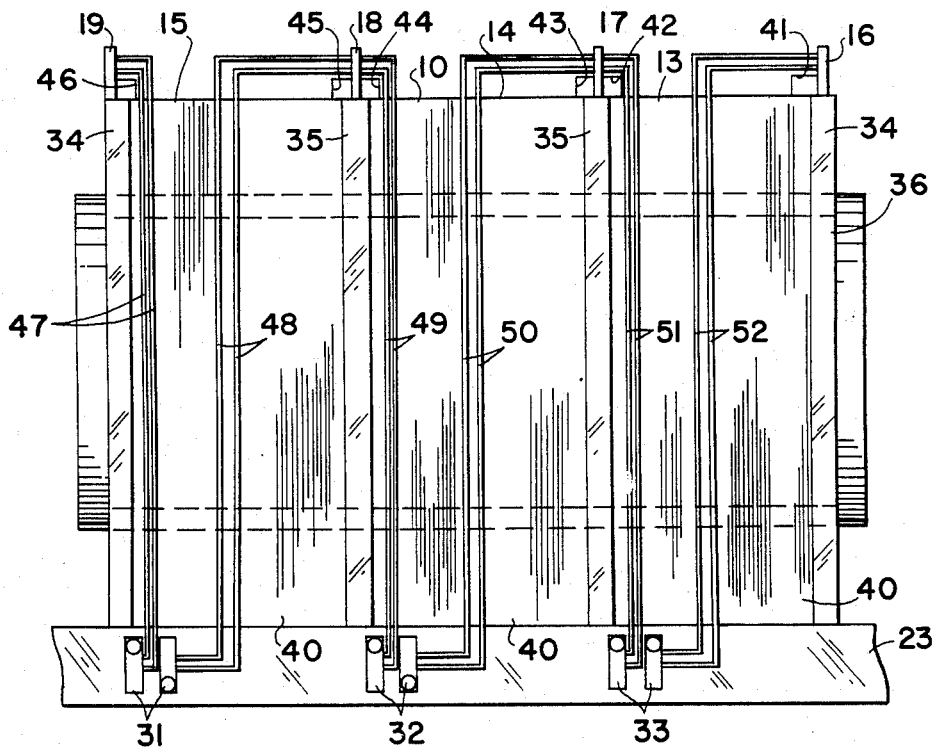
FIG. 4 is a front elevational view of the field coil of this invention as shown in FIG. 1 showing the electrical connections.
Figure 5:
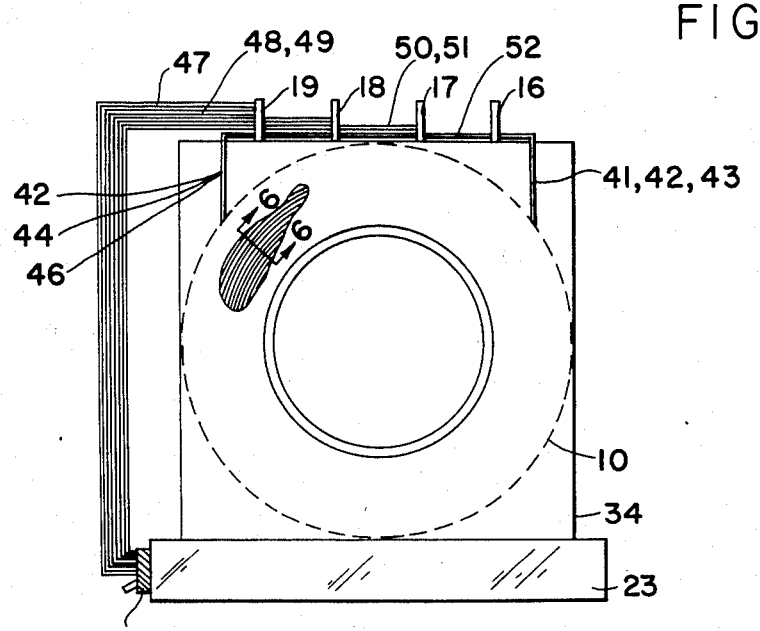
FIG. 5 is an end elevational view of the field coil of FIG. 4.

In FIGS. 4 and 5 there are shown the electrical connections available for this invention. Coil 13 is made up of two equal lengths of continuous windings 40 of wire, one being steel and the other being copper. The electric current is induced in the copper wire, and the magnetic flux from magnets 30 is disseminated through coil 13 by means of the steel wire. The two ends of the copper wire in coil 13 are hooked to terminals 16 and 17, the respective ends shown as 41 and 42. In the preferred arrangement wherein the copper wire consists of two twisted strands of insulated copper wire, one end of one strand is connected to the other end of the opposite strand, and the remaining two ends are connected to the coil terminals, e.g., 16 and 17 for coil 13. This arrangement provides a double length of a copper strand in each coil, which produces better current induction than a single length of two small strands or a single length of a large strand. The steel wire is not connected to anything and merely fills in the spaces between adjacent turns of the copper wire. Similarly, the two ends 43 and 44 of the copper wire in coil 14 are connected to terminals 17 and 18 respectively; and the two ends 45 and 46 of the copper wire in coil 15 are connected to terminals 18 and 19, respectively. Each end of coils 13, 14, and 15 is also connected from terminals 16, 17, 18, and 19 to double-throw switches 33, 32, and 31 respectively by leads 52, 51, 50, 49, 48, and 47. These leads and switches are arranged so that coils 13, 14 and 15 can be connected in parallel or in series. It is well known that such connections provide flexibility in choosing whether one wants to produce higher voltage with lower amperage or lower voltage with higher amperage. The parallel connection produces the former and the series connection produces the latter.

Figure 8:
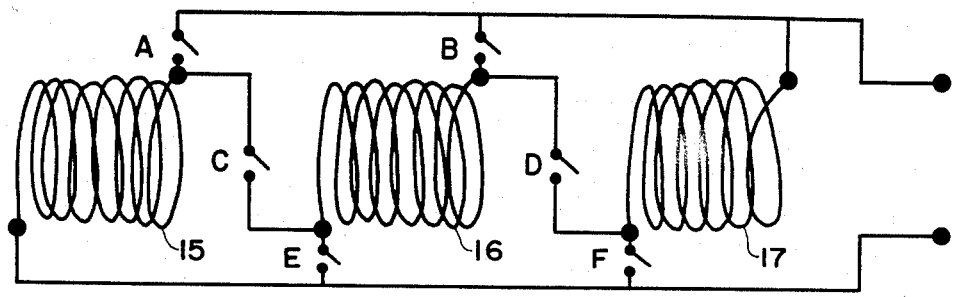
FIG. 8 is a wiring diagram for the field coil of FIGS. 4 and 5.

The wiring diagram of field coils 13, 14, and 15 is shown in FIG. 8. All three coils 13, 14, and 15 are joined together electrically with switches to permit series or parallel connections. Switches 61, 62, 63, 64, 65, and 66 may be opened or closed to produce different current characteristics at terminal 60. When switches 61, 62, 65 and 66 are closed and switches 63 and 64 are open, the three coils are in parallel to provide higher voltage and lower amperage. Contrariwise, when switches 61, 62, 65, and 66 are open and switches 63 and 64 are closed, the three coils are in series to provide lower voltage and higher amperage. Other connections and switching combinations may be used to provide other results as are known in the art.

The following actual operating examples show how the generator of this invention functions. These examples are intended to be illustrative of the invention and not to limit the invention in any manner whatsoever.

EXAMPLE 1

In an experimental generator of the following characteristics and operating under the following conditions an induced current was produced as described below:

Field Coil

Three equal coils were prepared as shown in FIG. 1 each having an inside diameter of 1.9375 inches, an outside diameter of 3.0 inches, and a length along the axis of the coil of 1.125 inches. Each coil contains 250 ft. of twisted 28 ga. copper wire wrapped alongside 250 ft. of twisted 28 ga. steel wire. The twisted wire has two strands of 28 ga. wire twisted with about 17 turns per inch of length. The copper wire is enamel insulated and the strands are connected to each other at opposite ends to make an effective length of 500 ft. of one strand. The copper wire in each coil is connected to double-pole double-throw switches (31, 32 and 33 in FIG. 1) so as to provide optional arrangements for joining the three coils (13, 14, and 15 in FIG. 1) in a series circuit or a parallel circuit.

Armature

An aluminum tube 0.75 inch outside diameter and 4.5 inches long with an axial shaft 0.25 inch in diameter is covered with 54 disk magnets each, 0.25 inch thick and about 0.375 inch in diameter. The magnets are adhesively bonded to the outside of the tube in six equally spaced parallel rows of 9 magnets each. The magnets are spaced lengthwise along the tube so that 3 magnets are facing each coil (13, 14, or 15) of the field coil. The rows of magnets are parallel to the axis of the tube. The magnets were purchased from Radio Shack, being called "button magnets" having a 70 gram pull when tested with a metal disk 1.25 inches in diameter.

Warp Sleeve

An aluminum tube 1.5 inches inside diameter and 1.625 inches outside diameter 5 inches long is modified by adhesively bonding to the outside surface three equally spaced strips of galvanized sheet steel 0.0313 inch thick and 0.375 inch wide in a spiral configuration (see FIG. 3A). The spiral has an angle of 10° with the longitudinal axis of the tube and the three strips are arranged in a parallel spiral configuration.

Operation

When the above experimental unit is operated with the field coil and the armature stationary and the warp sleeve rotated at 1200 r.p.m. the following alternating current (AC) is produced:

|  | Volts | Amperes |
|---|---|---|
| Parallel connection | 4.16 | 0.750 |
| Series connection | 12.5 | 0.250 |

The same results are achieved if the field coil and the warp sleeve are stationary and the armature is rotated at 1200 r.p.m.. It is preferred, however, to rotate the warp sleeve since it is lighter in weight and requires less power to rotate it than does the armature.

EXAMPLE 2

In a similar experimental generator to that described in Example 1, tests were made to compare the results of using twisted wire and of using non-twisted wire. All sizes and speeds were the same as described in Example 1 except as follows:

(1) The field coil consisted of one coil containing 280 ft. of 22 ga. copper wire and 280 ft. of 22 ga. steel wire. When the coil was made of twisted wire it contained two strands each, 140 ft. long, twisted together with the copper strands connected to make a total length of 280 ft. as generally described in Example 1. When the coil was made of untwisted wire it was wrapped with 280 ft. of single strand copper wire and single strand steel wire. In each instance the total resistance of the copper wire was 4.3 ohms.

The following A.C. results were obtained at 1200 r.p.m. speed of the warp sleeve:

|  | Volts | Amperes |
|---|---|---|
| Twisted wire | 1.32 | 0.117 |
| Straight wire | 0.903 | 0.082 |
| Difference | 0.417 | 0.035 |

It therefore has been found that the use of twisted wire, all other variables remaining constant, produced 30–35% increase in voltage and amperage in the generator of this invention.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An electric generator including a stationary field coil, an armature rotatable within the field coil, and a warp sleeve rotatable between said coil and said armature; said coil comprising side-by-side alternating insulated lengths of wire, one insulated length consisting of copper wire and the other insulated length consisting of steel wire; said armature comprising a cylindrical core structure containing on its outside surface a plurality of spaced parallel lengthwise strips of magnetic material having one polarity alternating with a plurality of spaced parallel lengthwise strips of opposite polarity; said warp sleeve comprising a hollow cylinder positioned in close proximity to and spaced apart from the inner surface of said coil and the outer surface of said armature, said sleeve having over its entire length alternating lengthwise strips of material transparent to magnetic flux and material attractive to magnetic flux; and means to rotate one of said armature and said warp sleeve while maintaining the other stationary.

2. The generator of claim 1 which includes means to make each of said armature and said warp sleeve selectively non-rotatable with respect to said field coil.

3. The generator of claim 1 wherein said armature comprises a tubular core with lengthwise rows of disc magnets attached to the outside surface of the tubular core.

4. The generator of claim 3 wherein the rows of magnets are parallel to the lengthwise axis of the armature.

5. The generator of claim 3 wherein the rows of magnets are parallel to each other and in a helical configuration.

6. The generator of claim 1 wherein said field coil includes a plurality of separate cylindrical coils of wire, each separate coil abutting at one end to the next adjacent coil.

7. The generator of claim 6 wherein each separate coil is connected to each other separate coil through switch means capable of selectively joining the coils in series and in parallel.

8. The generator of claim 1 wherein said warp sleeve comprises a tube of aluminum with spaced lengthwise strips of steel fastened to the outwide surface of the tube.

9. The generator of claim 8 wherein said strips are parallel to the lengthwise axis of the tube.

10. The generator of claim 8 wherein said strips are parallel to each other and are positioned in the form of a helix on said tube.

11. The generator of claim 1 wherein each said length of wire comprises a plurality of lengths of twisted insulated strands of wire.

12. The generator of claim 11 wherein said copper wire comprises two insulated strands of copper wire with one end of one strand being connected to the opposite end of the other strand.

13. An electric generator comprising:
(a) a stationary field coil having a central lengthwise cylindrical passageway and including at least three coils of wire electrically connected to each other through switches to provide selective parallel or series connections, each coil including windings of substantially equal lengths of insulated copper wire and insulated steel wire positioned such that contiguous lengthwise to substantially every portion of the copper wire winding is an equal portion of the steel wire winding;
(b) a cylindrical rotatable armature located concentrically inside and spaced apart from said field coil, the outside surface of the armature being substantially covered with parallel lengthwise strips of magnets of substantially the same surface area and magnetic strength, each strip having one identical polarity over its entire outside surface and being positioned lengthwise between adjacent strips having the opposite polarity over their entire outside surfaces;
(c) a warp sleeve comprising a selectively rotatable tubular structure mounted concentrically in the space between the field coil and the armature and spaced apart from each, the sleeve consisting essentially of alternating lengthwise strips of material transparent to magnetic flux positioned between alternating strips of material attractive to magnetic flux; and
(d) means to rotate one of said armature and said sleeve about the lengthwise axis common to each while keeping the other stationary.

14. The generator of claim 13 wherein said sleeve has strips which are parallel to each other and parallel to the central lengthwise axis of the sleeve.

15. The generator of claim 13 wherein said sleeve has strips which are parallel to each other and are helical about the central lengthwise axis of the sleeve.

16. The generator of claim 13 wherein the sleeve has alternating strips of nonferrous material and ferrous material.

17. The generator of claim 16 wherein the nonferrous material is aluminum.

18. The generator of claim 13 wherein said armature comprises a tubular support of nonferrous material having affixed to its outer surface permanent magnets in an even number of substantially equal size strips.

19. The generator of claim 13 wherein each of the said copper wire and the said steel wire comprises a plurality of fine copper wires and fine steel wires, respectively, twisted to produce a single strand.

20. The generator of claim 13 wherein said means to rotate includes a motor, a motor pulley, a pulley on the sleeve or the armature, and a belt for the pulleys.

21. The generator of claim 19 wherein one end of one of said strands of copper wire is connected to the opposite end of the other strand of said copper wire.

* * * * *